US009020983B2

(12) United States Patent
Qi et al.

(10) Patent No.: US 9,020,983 B2
(45) Date of Patent: Apr. 28, 2015

(54) ADDRESS LIST SYSTEM AND METHOD OF IMPLEMENTING AN ADDRESS LIST

(75) Inventors: Xiaoyun Qi, Chongqing (CN); Junsheng Qiao, Hebei (CN)

(73) Assignees: Wootion Technology Co., Ltd., Sanhe, Hebei (CN); Chongqing Momo Tech Center (General Partner), Chongqing (CN)

( * ) Notice: Subject to any disclaimer, the term of this patent is extended or adjusted under 35 U.S.C. 154(b) by 0 days.

(21) Appl. No.: 13/001,059

(22) PCT Filed: Apr. 14, 2009

(86) PCT No.: PCT/CN2009/000395
§ 371 (c)(1),
(2), (4) Date: Mar. 7, 2011

(87) PCT Pub. No.: WO2010/006497
PCT Pub. Date: Jan. 21, 2010

(65) Prior Publication Data
US 2011/0167093 A1 Jul. 7, 2011

(30) Foreign Application Priority Data
Jul. 15, 2008 (CN) .......................... 2008 1 0069983

(51) Int. Cl.
*G06F 7/00* (2006.01)
*H04W 4/18* (2009.01)
*H04M 1/2745* (2006.01)

(52) U.S. Cl.
CPC .......... *H04W 4/18* (2013.01); *H04M 1/274516* (2013.01)

(58) Field of Classification Search
CPC .................... G06F 17/30321; G06F 17/30386; G06F 17/30908
USPC ......................................................... 707/809
See application file for complete search history.

(56) References Cited

U.S. PATENT DOCUMENTS 5,886,997 A * 3/1999 Shimada et al. ............... 370/527
6,002,929 A * 12/1999 Bishop et al. .................. 455/431
(Continued)

FOREIGN PATENT DOCUMENTS

CN 1694093 A 11/2005
EP 1589730 A1 10/2005

OTHER PUBLICATIONS

Form PCT/ISA/210, WO, Jun. 25, 2009, ISR for PCT/CN2009/000395.
(Continued)

*Primary Examiner* — Tony Mahmoudi
*Assistant Examiner* — Michael Le
(74) *Attorney, Agent, or Firm* — Locke Lord LLP; Jeffrey D. Hsi

(57) ABSTRACT

The invention provides an address list system and a method for implementing an address list. The system includes at least one data input end and at least one inquiry end. The data input end includes a first input unit, a first data processing unit, a first storage unit and a transmitting unit. The inquiry unit includes a receiving unit, a second storage unit, a second data processing unit and an inquiry unit. The address list information of the inquiry end is displayed in a tree structure. In accordance with the address list implementation method, address list information is input at the data input end to form and store data files having uniform format. Data is prepared at the data input terminal. The data input terminal interacts with the inquiry terminal to update data files of a uniform data format in the inquiry terminal. A tree-like address list is formed at the inquiry terminal.

18 Claims, 11 Drawing Sheets

(56) References Cited

U.S. PATENT DOCUMENTS

| | | | |
|---|---|---|---|
| 6,563,800 B1* | 5/2003 | Salo et al. | 370/264 |
| 7,333,994 B2* | 2/2008 | Glover et al. | 707/796 |
| 7,634,463 B1* | 12/2009 | Katragadda et al. | 701/431 |
| 7,873,678 B2* | 1/2011 | Tonev et al. | 707/805 |
| 2003/0004937 A1* | 1/2003 | Salmenkaita et al. | 707/3 |
| 2003/0217181 A1* | 11/2003 | Kiiskinen | 709/248 |
| 2004/0029567 A1* | 2/2004 | Timmins et al. | 455/412.1 |
| 2004/0131173 A1* | 7/2004 | Janssen et al. | 379/355.02 |
| 2004/0229654 A1* | 11/2004 | Farcasiu | 455/566 |
| 2005/0059418 A1* | 3/2005 | Northcutt | 455/517 |
| 2005/0138003 A1* | 6/2005 | Glover et al. | 707/3 |
| 2005/0164651 A1* | 7/2005 | Ollis et al. | 455/100 |
| 2006/0239215 A1* | 10/2006 | Munje | 370/310 |
| 2006/0246884 A1* | 11/2006 | Ansari | 455/419 |
| 2006/0265410 A1* | 11/2006 | Christianson et al. | 707/100 |
| 2007/0061381 A1* | 3/2007 | Newton et al. | 707/201 |
| 2007/0150479 A1* | 6/2007 | Issa et al. | 707/10 |
| 2007/0264977 A1* | 11/2007 | Zinn et al. | 455/414.1 |
| 2007/0280445 A1* | 12/2007 | Shkedi | 379/93.23 |
| 2008/0104277 A1* | 5/2008 | Tian | 709/248 |
| 2008/0126661 A1* | 5/2008 | Lin et al. | 710/304 |
| 2008/0167020 A1* | 7/2008 | Guedalia et al. | 455/414.2 |
| 2008/0189320 A1* | 8/2008 | Lee | 707/102 |
| 2009/0150488 A1* | 6/2009 | Martin-Cocher et al. | 709/204 |
| 2009/0177800 A1* | 7/2009 | Gidron et al. | 709/248 |

OTHER PUBLICATIONS

European Search Report for EP Application No. 09797344 (Jan. 23, 2013).

* cited by examiner

ADDRESS LIST SYSTEM AND METHOD OF IMPLEMENTING AN ADDRESS LIST

This application is the U.S. national phase, pursuant to 35 U.S.C. §371, of PCT international application Ser. No. PCT/CN2009/000395, filed Apr. 14, 2009, designating the United States and published in Chinese as publication WO 2010/006497 A1 on Jan. 21, 2010, which claims priority to Chinese application Ser. No. 200810069983.9, filed Jul. 15, 2008. The entire contents of the aforementioned patent applications are incorporated herein by this reference.

FIELD OF THE INVENTION

The present invention relates to an address list system for use in a communication device and a method of implementing the address list system.

BACKGROUND ART

With the development of the society, people need to contact more and more other people or organizations. How to store and manage information about these contacts is a big challenge for the modern generation. Conventionally, contact information is stored and managed in paper form, such as compiled and printed yellow pages, address list of enterprises, and personal telephone directories kept by individuals. For managing contact information in paper form, there exist some defects, for example, being inconvenient to carry, look up and modify, so it cannot keep up with the times. With the development of electronic information technology, address list management system on computer arises, but a computer cannot be carried about and cannot perform such contacting operations as dialing a phone number according to the result of search, so such address list management system still is not satisfactory.

Nowadays, such mobile devices as cell phones and PDAs have become indispensable tools for life and work, and such tools generally also have built-in address lists. However, said address lists have the following defects: single function, i.e. they can only store such fixed information as telephone numbers of the contacts, but cannot record the various ways of communication that are currently in use; limited storage capacity, i.e. the address lists of most of the existing mobile devices have a limitation in capacity, for example, they can store 500 or 1000 pieces of contact information at most; inconvenience for input, i.e. it is almost impossible to input a large amount of contact data into said mobile devices; some cell phones at present have PC terminal management software, so the contact information can be inputted at the PC terminal to form a data file, and then said file is imported to the cell phone, but since address lists of existing different mobile devices have different formats, and data inputted to the PC terminal can only be imported to mobile devices of the same type, the owner of different mobile devices has to input the same contact information to different mobile devices, thus the repeated work results in a waste of manpower. Meanwhile, most of the cell phone terminals at present can only manage one address list file, so when new address list file is imported, the original address list file will be overwritten, in other words, in the prior art, one cell phone cannot accept multiple data files having different data items generated at various PC terminals. In addition, the existing address lists are only capable of simply grouping management, which is far from satisfying the practical needs in a time with more and more complicated social organization structure.

To overcome some of the above-mentioned defects, there are also some solutions in the prior art, for example, China Patent No. ZL03157125.5, (Title: Telephone Directory Information Sharing System of a Mobile Phone), which discloses a telephone directory information sharing system used among a plurality of mobile phones. The mobile phones are capable of sending and receiving email, and newly recorded or changed telephone directory information can be shared in any group via email; but said method is only suitable for information updating of the already registered contacts, namely, when the information of a person changes, his information recorded on the cell phones of his contacts, which has been recorded by the person, can be updated by means of email. It only has a single function, and most cell phones and mobile networks currently do not support email sending. Another example is China Application No. 200410049886.5, (Title: A Telephone Directory System and A Method for Telephone Directory Updating and Calling at the Mobile Inquiry Terminal), wherein a telephone directory system is disclosed, which is used in mobile communication network and comprises a directory server for storing user contact information containing user identity and several contact identities contained in each user, and the purpose of said application is the same as that of the above-mentioned China Patent No. ZL03157125.5, i.e. for conveniently informing contacts of the user when the contact information of said user has been changed. In China Application No. 200510020290.7 (A Construction Method of a Treelike Address List), a construction method of a treelike address list has been disclosed, which focuses on categorizing the contacts. The categories are subdivided into sub-categories, and the categorization structure is treelike. The same contact can be placed in different categories, but information of all contacts are in the same data link list file. Said method concerns establishing, deleting and changing the treelike structure of the contacts, and the data structure of the system, and it implements algorithms of searching, adding, deleting and changing contacts, and all the implementations are based on operation on the link list data of the same contact, so it still cannot achieve the purpose of importing data inputted at a plurality of PC terminals to a plurality of mobile inquiry terminals of different models.

The existing techniques fail to solve the problems that the mobile inquiry terminals have limited storage capacity and that it is difficult to input, backup and import the contact information, and that the contact information cannot be transferred and shared among mobile inquiry terminals of different platforms and different models

SUMMARY OF THE INVENTION

In order to solve the above-mentioned problems, the present invention provides an address list management system and an address list management method, which can solve the problem that the address list information file inputted at a plurality of computer terminals cannot be imported to a plurality of inquiry terminals of different platforms and different models in the prior art, and which can display, at the inquiry terminal, the records in the address list in a treelike structure.

The object of the present invention is realized like this: an address list system, comprising at least one data input terminal and at least one inquiry terminal, the data input terminal comprising:

a first input unit for inputting address list information to a first data processing unit;

a first data processing unit for receiving the address list information input by the input unit and performing a format conversion so as to form at least one data file having a uniform data format, said data file containing at least one piece of record;

a first storage unit for storing data generated by the first data processing unit; and a transmission unit for establishing a connection with the inquiry terminal and transmitting data files of a uniform data format to the inquiry terminal;

the inquiry terminal comprising:

a receiving unit for establishing a connection with the data input terminal and receiving the data files transmitted from the data input terminal;

a second storage unit;

a second data processing unit for operating and controlling the data files; and an inquiry unit for performing local inquiry of the address list information in the second storage unit;

the address list information being displayed in a treelike structure at the inquiry terminal.

Further, the data file comprises a relation identifier pointing to its parent node, and the inquiry unit organizes at least one data file into a treelike structure according to the relation identifier pointing to the parent node so as to be displayed.

Further, the data file also comprises node information, and the record and the node information contain relation identifier pointing to the parent node.

Further, the data items of the record consist of uniform data items and personalized data items.

Further, the data input terminal is a computer, and address list information can be communicated among a plurality of input terminals.

Further, the inquiry terminal is a device having the function of a telephone.

Further, the first input unit inputs information by means of input device entering and/or file importing.

Further, the inquiry terminal also comprises a subscriber identity module reading unit for reading the address list information in the subscriber identity module and storing said information into the second storage unit.

Further, the inquiry terminal also comprises a second input unit for inputting address list information and storing said information into the second storage unit.

Further, the second storage unit consists of a public data area and a private data area.

The present invention also provides a method of implementing the address list, which comprises the following steps:

A. inputting information at the data input terminal and forming and storing data files of a uniform format;

B. preparing data at the data input terminal, and the data input terminal interacting with the inquiry terminal to update data files in the inquiry terminal;

C. forming a treelike address list at the inquiry terminal.

Further, step A specifically includes the following steps:

A1. setting data items;

A2. establishing sub-nodes and/or inputting record data;

A3. generating the relation identifier of each sub-node and/or each entered record pointing to the parent node and assigning it to the sub-node and/or record.

Further, step A1 specifically includes the following steps:

A11. setting the maximum number of data items;

A12. setting a uniform data item.

Further, information being inputted by manual entering at step A2, which specifically includes the following steps:

A21. entering the data content of the uniform data item;

A22. ending entering the record if there is no individualized data item;

A23. inputting the name and the data content of the individualized data item if there is one or more individualized data items;

A24. storing the individualized data information into an individualized data table;

Further, information is inputted by means of importing files at step A2, which specifically comprises the following steps:

A25. selecting the file to be imported;

A26. selecting to convert the imported file into data file or to insert the imported file into the existing data file;

A27. performing conversion if selecting to convert the imported file into data file;

A28. if selecting to insert the imported file into the existing data file, then first determining the node position where the imported file is inserted, and establishing a new node if necessary, and inserting the imported file to the determined node after format conversion;

Next, step B specifically includes:

B1. locating the node position where the imported data is inserted at the inquiry terminal, and establishing a new node if necessary, then locating the position of the node for the insertion;

B2. establishing a relationship between the imported data and the parent node, and writing the relation identifier pointing to the parent node into the corresponding data file;

B3. storing the data file into the second storage unit;

Further, said step B3 specifically includes the following steps:

B31. the inquiry terminal sending the local version information to the data input terminal;

B32. the data input terminal sending update message to the inquiry terminal according to the version information of the inquiry terminal B33. determining if the inquiry terminal updates data, if update is determined, the data input terminal transmitting data file to the inquiry terminal;

B34. the inquiry terminal receiving the data file and storing it into the second storage unit;

Further, at step C, the inquiry unit of the inquiry terminal generates a treelike address list according to the relation identifier pointing to the parent node.

According to the address list system and its implementation method of the present invention, the data processing unit of the data input terminal converts the input information into data files of a uniform format according to a certain rule, meanwhile, a corresponding data processing unit is provided at the inquiry terminal to process the data files transmitted from the data input terminal, so that data files of a uniform format can be transmitted to a plurality of different types of mobile inquiry terminals to be used. Besides, the address list information in the inquiry terminal system can be displayed in a treelike structure, so that the organization architecture of the contacts in the address list can be directly seen to facilitate searching. In a further technical solution of the present invention, the data files contain records and nodes which form a tree by means of the relation identifiers pointing to the parent node in the record and the node, meanwhile, when updating the data files of the data input terminal to the inquiry terminal, data in the updated data files can be attached to any node in the treelike address list in the inquiry terminal as required, so that a plurality of data files input and generated at a plurality of data input terminals can be imported to a plurality of inquiry terminals of different types, thus the present invention is particularly suitable for such complicated application environment as large-scaled enterprise or organization. Moreover, the present invention does not have any limitation to the platform of the inquiry terminal, so it is suitable for address list to be transferred and shared between mobile phones of different platforms and different models, which can solve the problem of importing the address list from an old cell phone to a new cell phone when people replace a new cell phone. The present invention can set a different uniform data item for each data file, and each piece of record can have different user-defined data items.

Other advantages, objects and features of the present invention will be described to some extent in the following description, and will be apparent to those skilled in the art to some extent from a study and investigation of the following texts, or will be taught by practice of the present invention. The object and other advantages of the present invention can be realized and obtained through the structures specially pointed out in the following description, claims and drawings.

BRIEF DESCRIPTION OF THE DRAWINGS

To make the object, technical solution and advantages of the present invention clearer, the present invention will be further described in detail in conjunction with the drawings below, wherein.

DETAILED DESCRIPTION OF THE INVENTION

The preferred embodiments of the present invention will be described in detail below with reference to the drawings.

Figure 1:
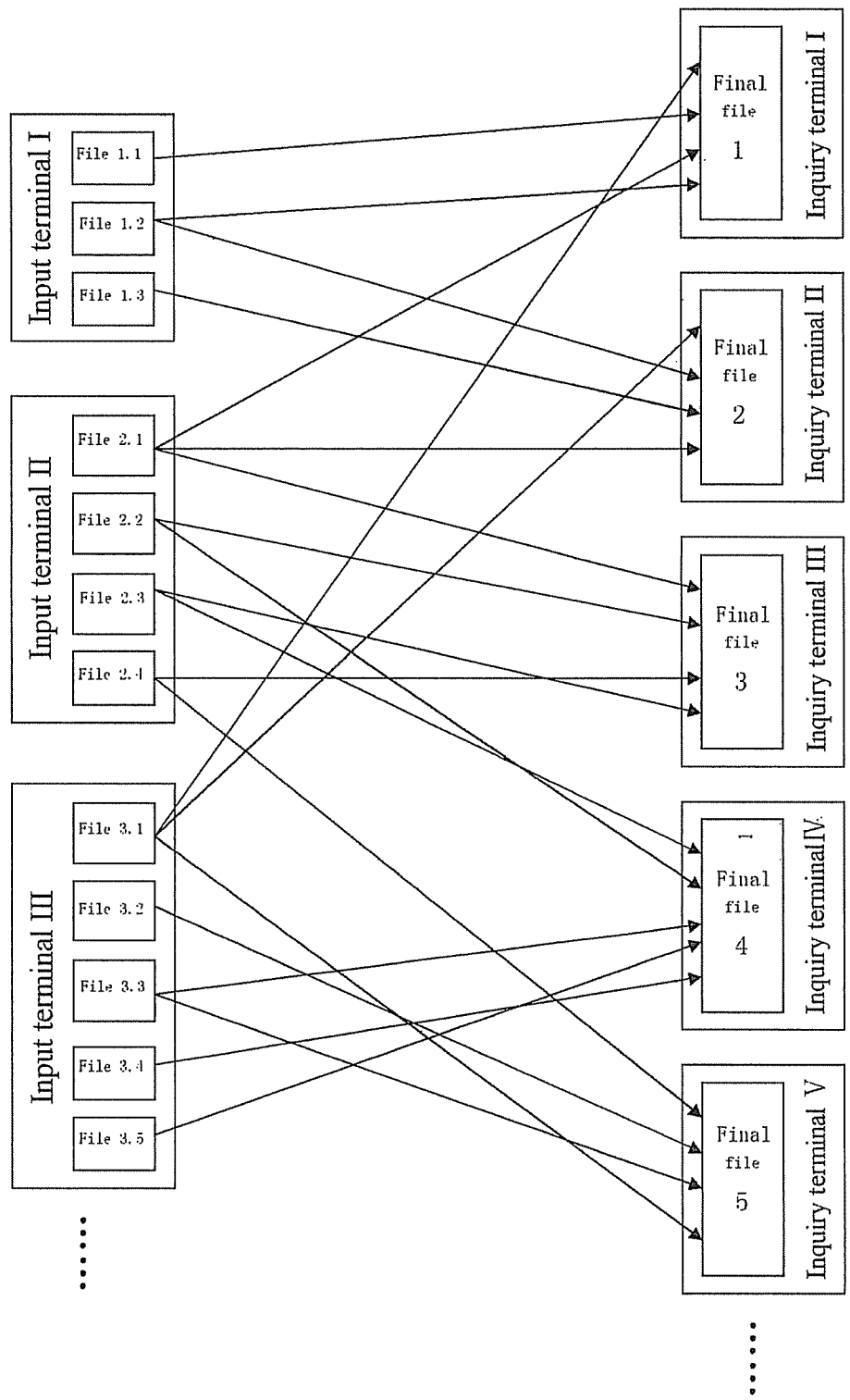
FIG. 1 is a schematic drawing of the file importing relationship of the present invention.
Figure 3:
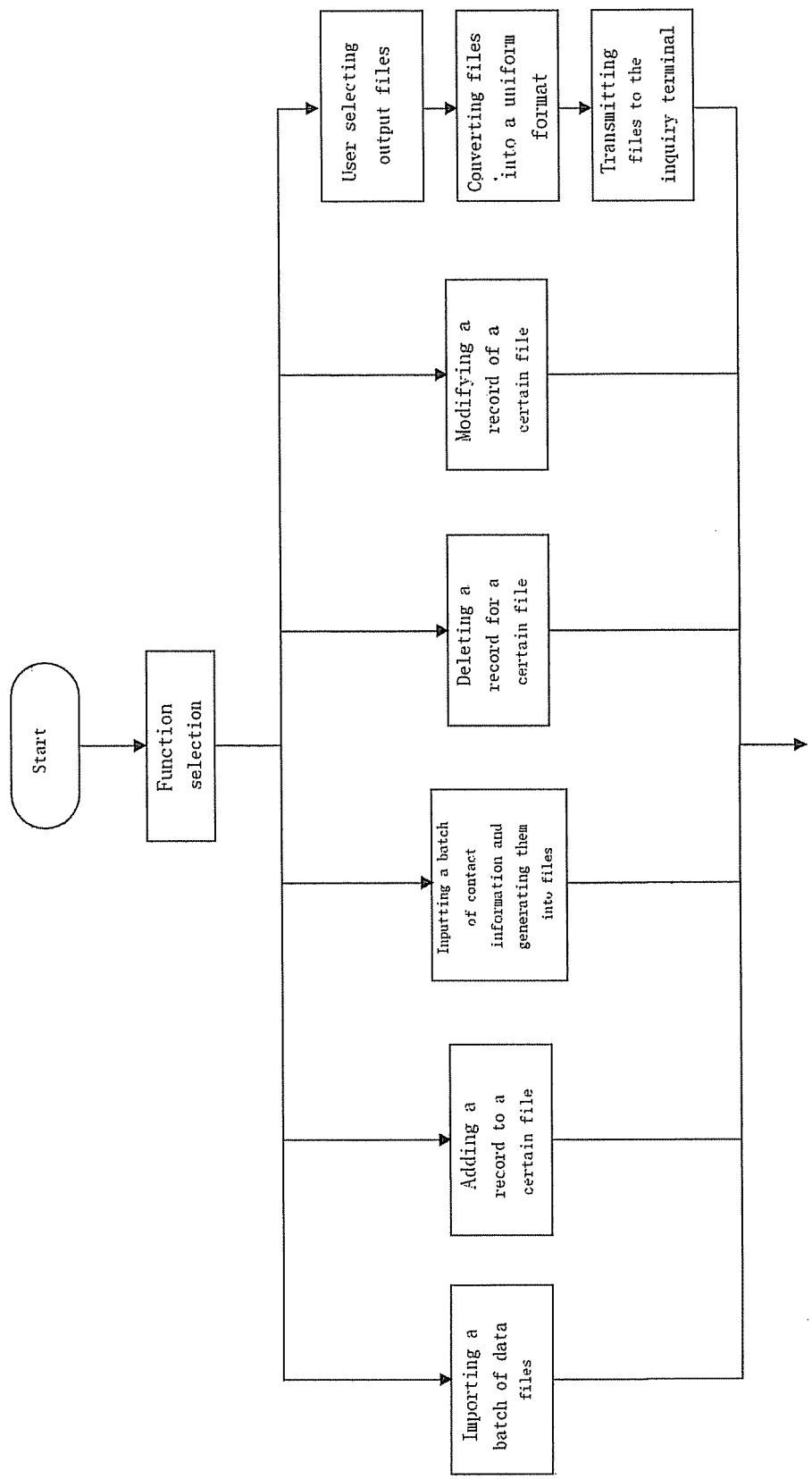
FIG. 3 is a flow chart of the function selection at the input terminal of the present invention.
Figure 7:
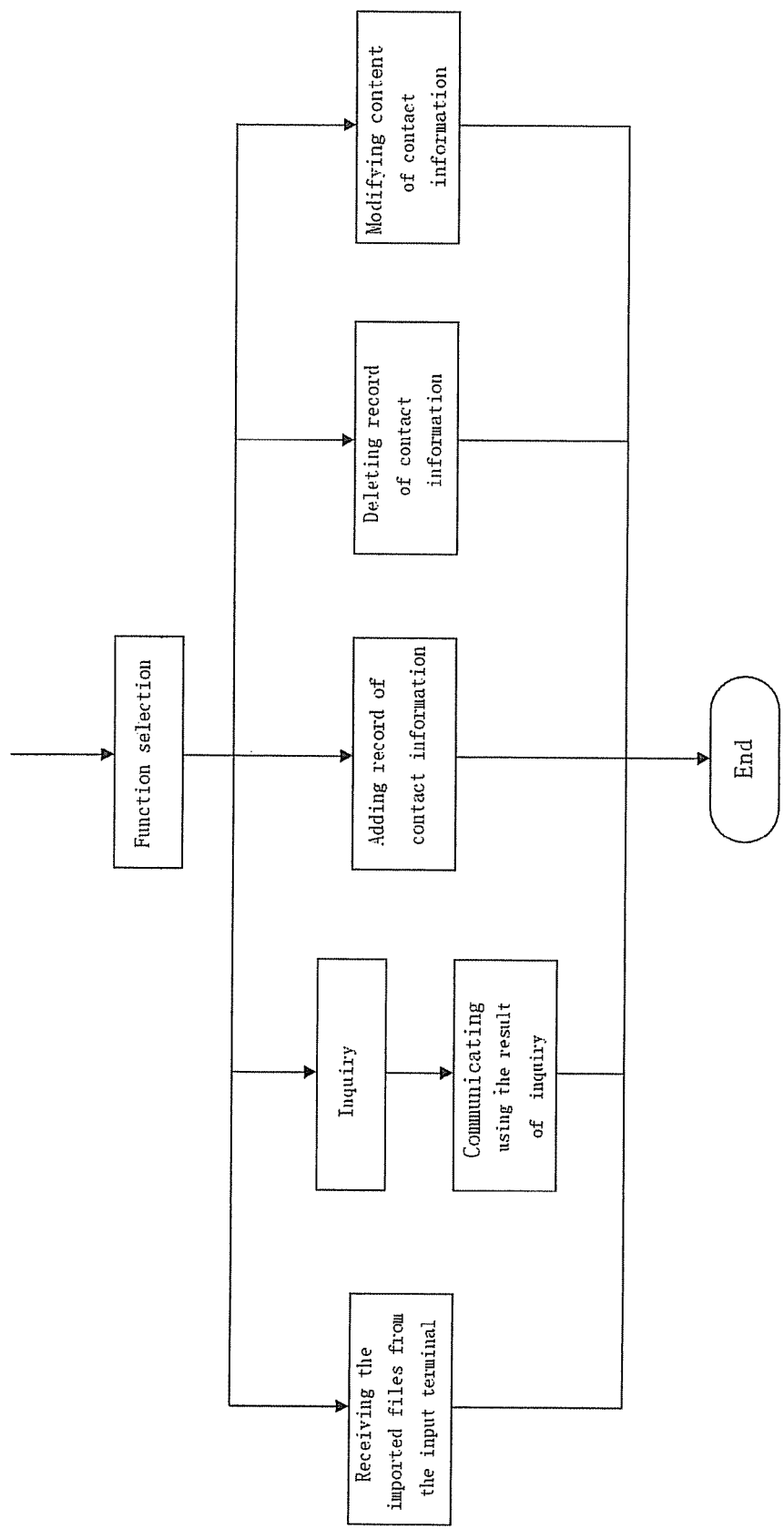
FIG. 7 is a flow chart of function selection at the inquiry terminal of the present invention.

With reference to FIGS. 1, 3 and 7, the address list system of the present preferred embodiment comprises at least one data input terminal and at least one inquiry terminal, a plurality of data files can be inputted and generated at a plurality of data input terminals and can be imported to a plurality of inquiry terminals, wherein the plurality of data files generated at each data input terminal can be imported to a plurality of inquiry terminals, and each inquiry terminal can also receive data files generated at a plurality of data input terminals; the data input terminal comprises:

a first input unit for inputting address list information to the first data processing unit, information being input by means of input device entering and/or file importing, and the address list information referring to contact record information and node information;

a first data processing unit for receiving the address list information input at the input unit and performing format conversion to form at least one data file with a uniform data format, said data file containing at least one piece of record;

a first storage unit for storing data generated by the first data processing unit; and a transmission unit for establishing a connection with the inquiry terminal and transmitting the data file of a uniform data format to the inquiry terminal, the data file containing the contact record information and/or node information, the record and node information comprising relation identifier of said node or record pointing to the parent node, the data file also containing the relation identifier of said data file pointing to the parent node, the data item of each record consisting of uniform data items and individualized data items, the uniform data item is the data item that is owned by each record in said data file, such as name, mobile phone number, office telephone number, home telephone number, etc., and the individualized data item is the data item that the user sets for a record or some records as required, such as QQ number, MSN number, etc., and each of the records may have different number and title of individualized data item.

The inquiry terminal comprises:

a receiving unit for establishing a connection with the data input terminal and receiving data files transmitted from the data input terminal;

a second storage unit, which consists of a public data area and a private data area, the public data area is used to store data files having a categorized treelike structure generated by merging data transmitted from the receiving unit and temporary data blocks formed during the data transmission process and the operation and control process, and the private data area is used to store information input by the second input unit, information read from the subscriber identity module by the subscriber identity module reading unit, and data generated by modifying data in the public data area; in order to protect safety of the user data, only information in the private data area that is entering at the inquiry terminal or read by the subscriber identity module is allowed to be copied to somewhere outside the inquiry terminal device.

A second input unit used for inputting information of the contacts and storing it into the second storage unit;

a subscriber identity module reading unit for reading the subscriber identity module information and storing it into the second storage unit;

a second data processing unit for operating and controlling the data files, including operations of adding, deleting and modifying;

an inquiry unit for performing local inquiry of the address list information in the second storage unit; and a subscriber identity module reading unit for reading the subscriber identity module (SIM card for short) information and storing it into the second storage unit.

To facilitate communication, the inquiry terminal can be but not limited to such a device having a communication function as a cell phone, a PDA and/or a landline phone; besides, a device having a display screen and a memory but without a communication function can also be used as the inquiry terminal of the address list.

The inquiry terminal displays the address list information in a treelike structure. There are many implementing modes of generating the treelike address list in the prior art, while the present embodiment adopts the mode in which the record and node information contains the relation identifier of said node or record pointing to the parent node, and the inquiry unit organizes a plurality of data files into a treelike structure to be displayed according to the relation identifier pointing to the parent node. In such a-mode, the inquiry terminal can receive a plurality of data files generated by the data input terminal and merge them into a treelike address list.

The format of said data file can be selected according to the needs and the development of the technology, but the data files generated by each data input terminal should have a uniform format, so that the files generated by a plurality of data input terminals can be imported to the same inquiry terminal. The data files of this embodiment use the XML format, but it is not limited to the XML format in practical application.

A fingerprint lock and password or the like can be set in the inquiry terminal to protect safety of information of all contacts or some contacts. Image data items can be set in the data files for the records, and the content of the image data item is a link to the images stored in the second storage unit, thus after taking a photo by the inquiry terminal, the photo can be entered into a single piece of record as one of the data items.

Figure 2:
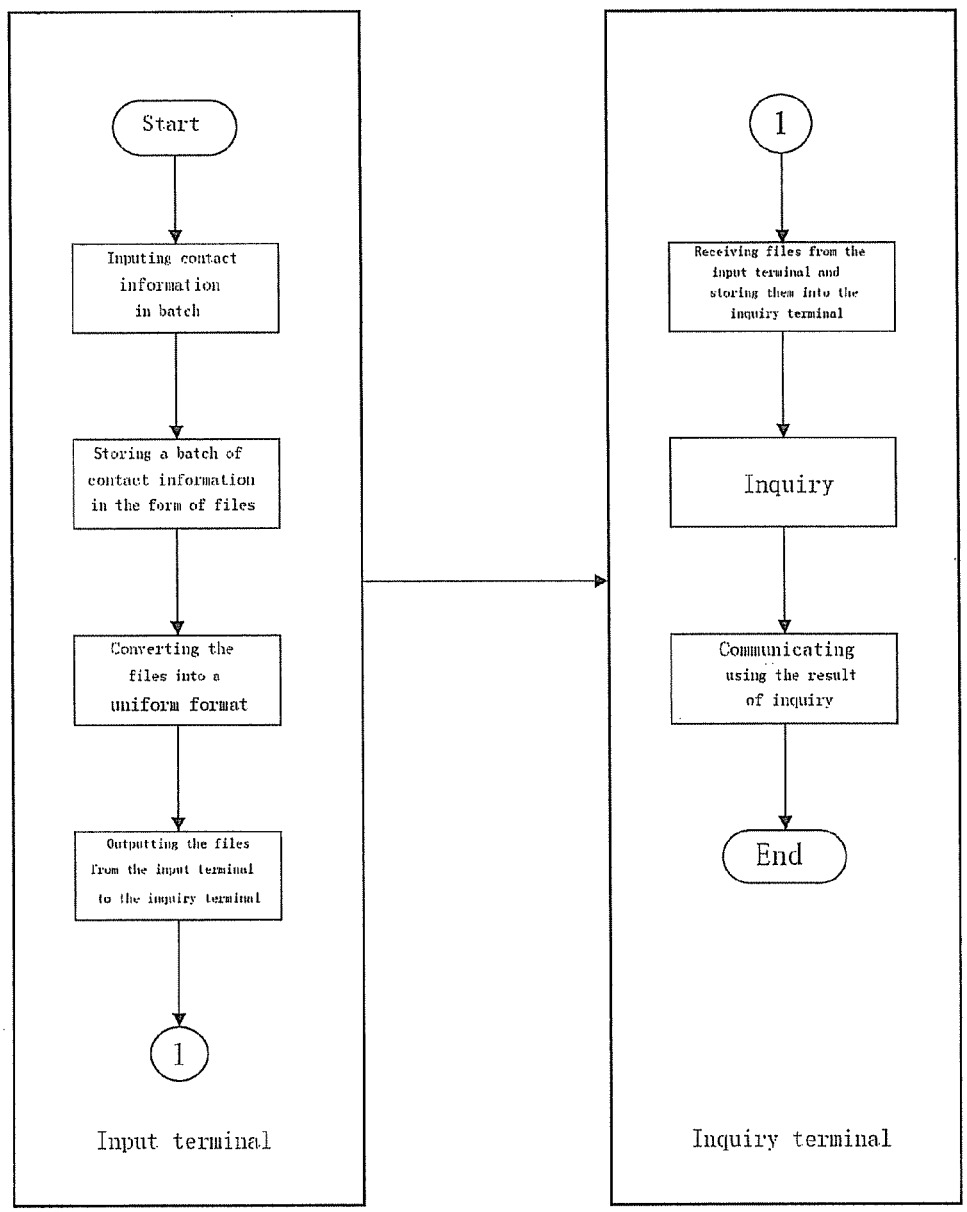
FIG. 2 is a flow chart of the main processing of the present invention.
Figure 5:
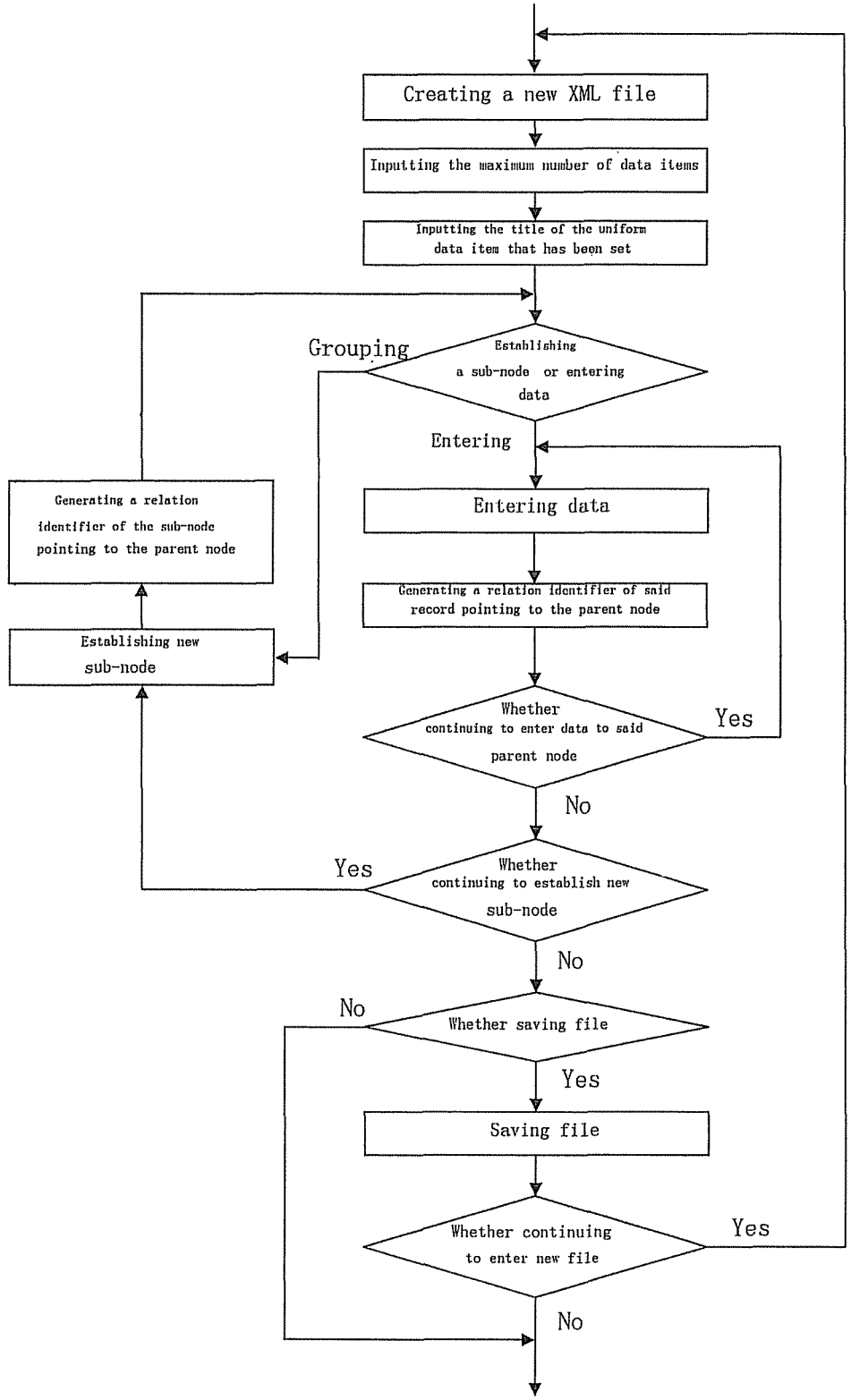
FIG. 5 a flow chart of generating a data file of XML format at the input terminal of the present invention.

With reference to FIG. 2, a method of implementing the address list, characterized by comprising the following steps:

A. inputting information at the data input terminal and forming data files of a uniform format for storage;

B. the data input terminal interacting with the inquiry terminal to update the data files in the inquiry terminal;

C. generating a treelike address list when the inquiry unit of the inquiry terminal displays the records.

Wherein step A specifically includes the following steps:
   A1. setting data items;
   A2. establishing sub-nodes and/or entering record data;
   A3. generating the relation identifier of each sub-node and/or each entered record pointing to the parent node and assigning it to the sub-node and/or record;

With reference to FIG. 5, taking an example of generating a data file of XML format, the step of inputting information by manual entering at an input device and generating a data file of XML format is illustrated:
   a1. creating a new XML file;
   a2. setting the maximum number of data items;
   a3. inputting the title of the uniform data item that has been set, such as name, mobile phone number, office phone number, home phone number, etc.;
   a4. selecting to establish a sub-node or to enter data, and performing step
   a5 if selecting to establish a sub-node, performing step a6 if selecting to input records;
   a5. establishing a sub-node and generating a relation identifier of the sub-node pointing to the parent node, and then returning to step A4;
   a6. entering data and generating a relation identifier of said piece of record pointing to the parent node;
   a7. selecting if continuing to enter data at said node, if yes, returning to step a6;
   a8. selecting if continuing to establish new sub-nodes, if yes, returning to step a5;
   a9. saving the file.

Figure 6:
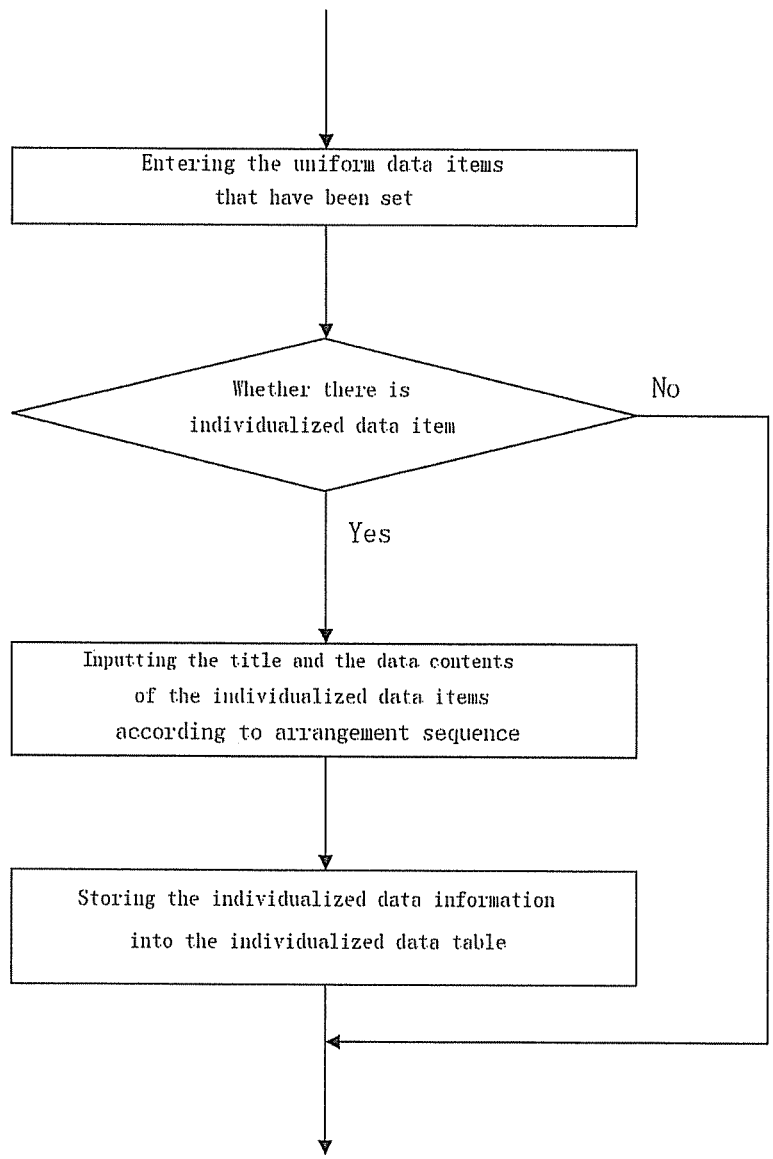
FIG. 6 is a flow chart of entering records at the input terminal of the present invention.

With reference to FIG. 6, wherein in step a6 information is inputted by manual entering, which specifically includes the following steps:
   a61. entering data contents of the uniform data items;
   a62. ending if there is no individualized data item;
   a63. inputting the title and data content of the individualized data item if there is individualized data item;
   a64. storing the individualized data information into the individualized data table.

Figure 4:
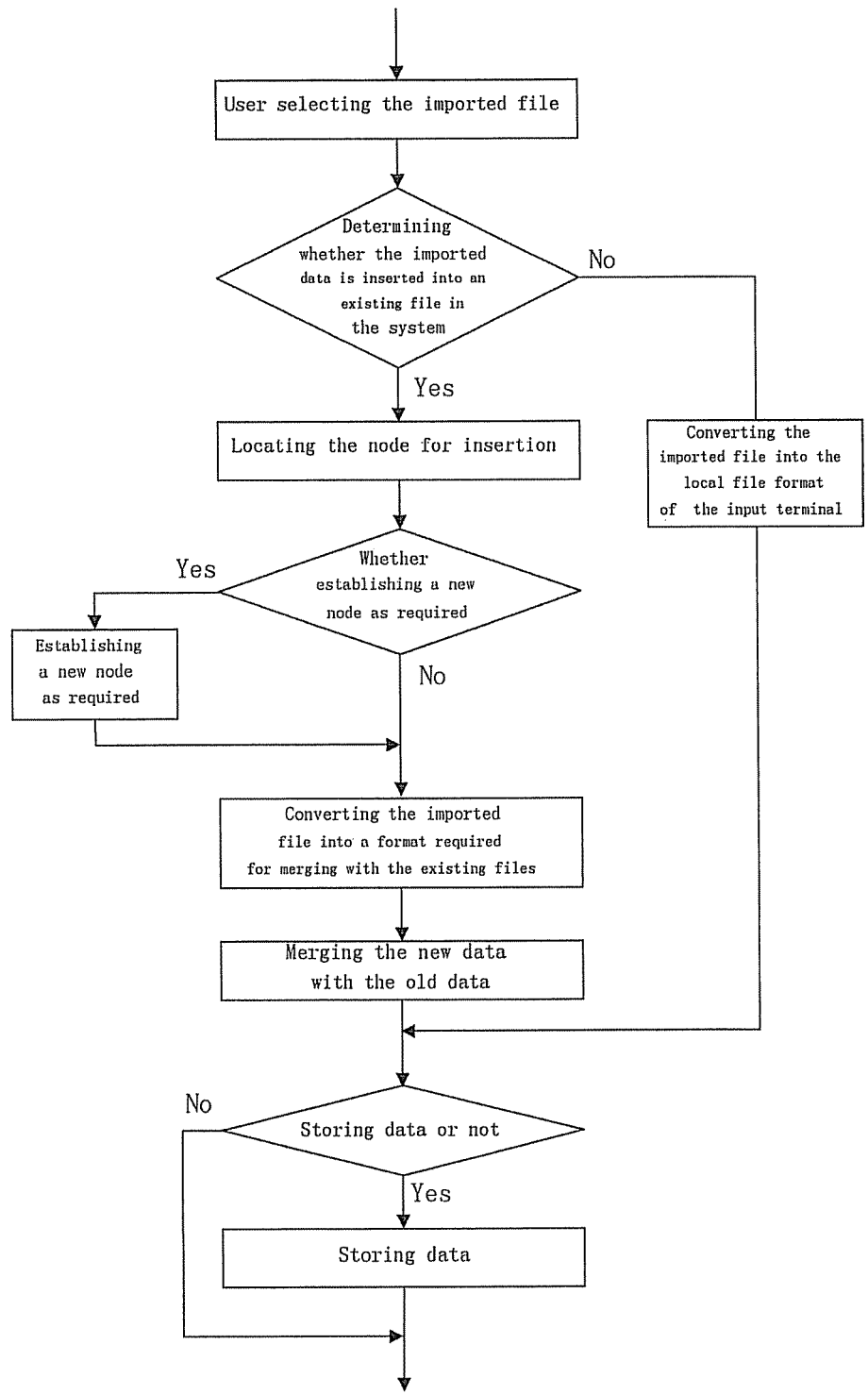
FIG. 4 is a flow chart of inputting files through importing mode at the input terminal of the present invention.

With reference to FIG. 4, wherein in step a6, information is inputted by means of importing files (such as EXCEL file), which specifically comprises the following steps:

a65. selecting the file to be imported;
   a66. selecting to convert the imported file into data file or to insert the imported file into the existing data file;
   a67. performing a conversion if selecting to convert the imported file into data file;
   a68. if selecting to insert the imported file into the existing data file, then first determining the position of the node to which the imported file is inserted, or establishing a new node if necessary, and then locating the node for insertion and inserting the imported file to the determined node after converting the format of the imported file.

Figure 8:
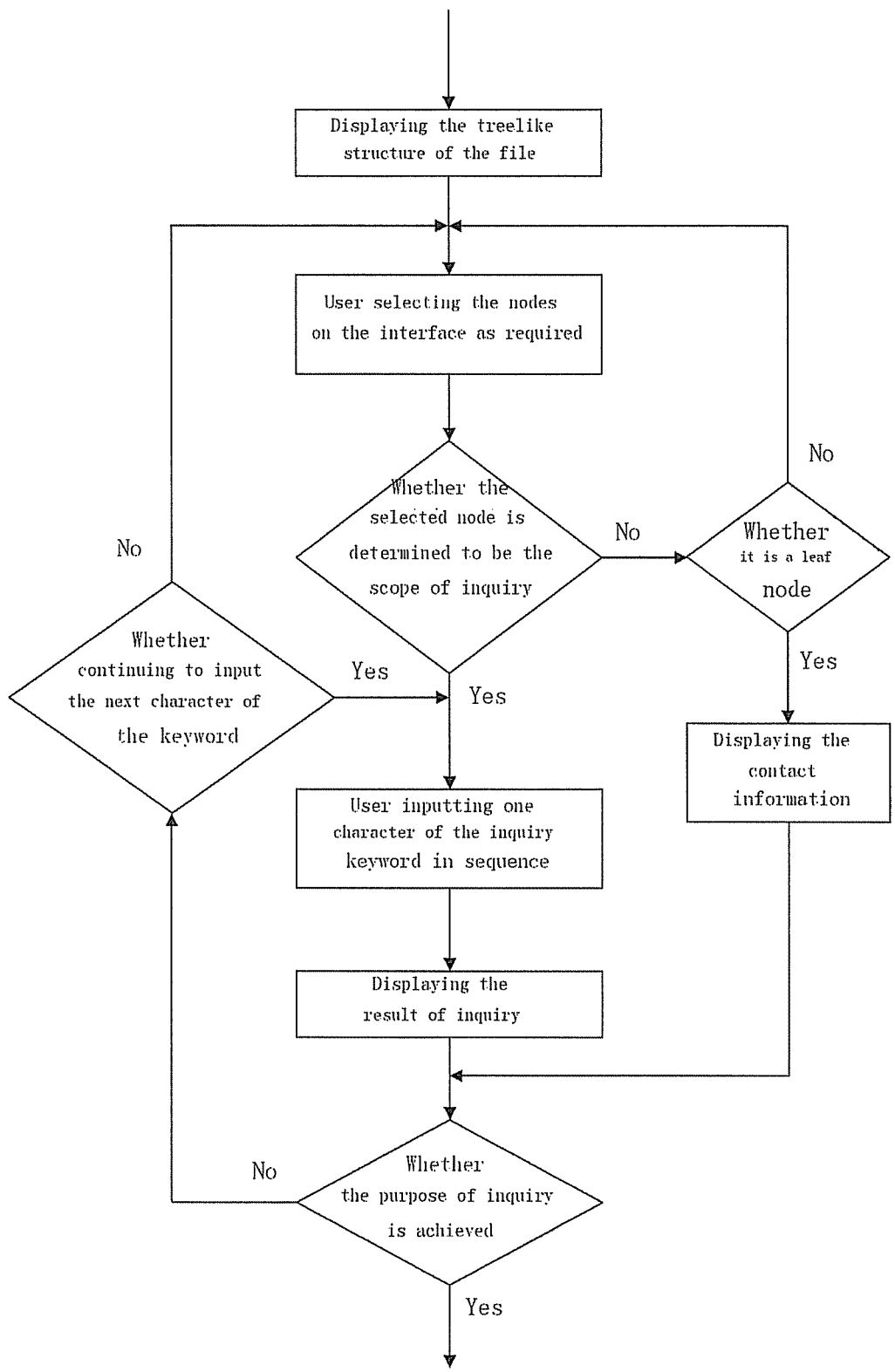
FIG. 8 is a flow chart of inquiring at the inquiry terminal of the present invention.
Figure 9:
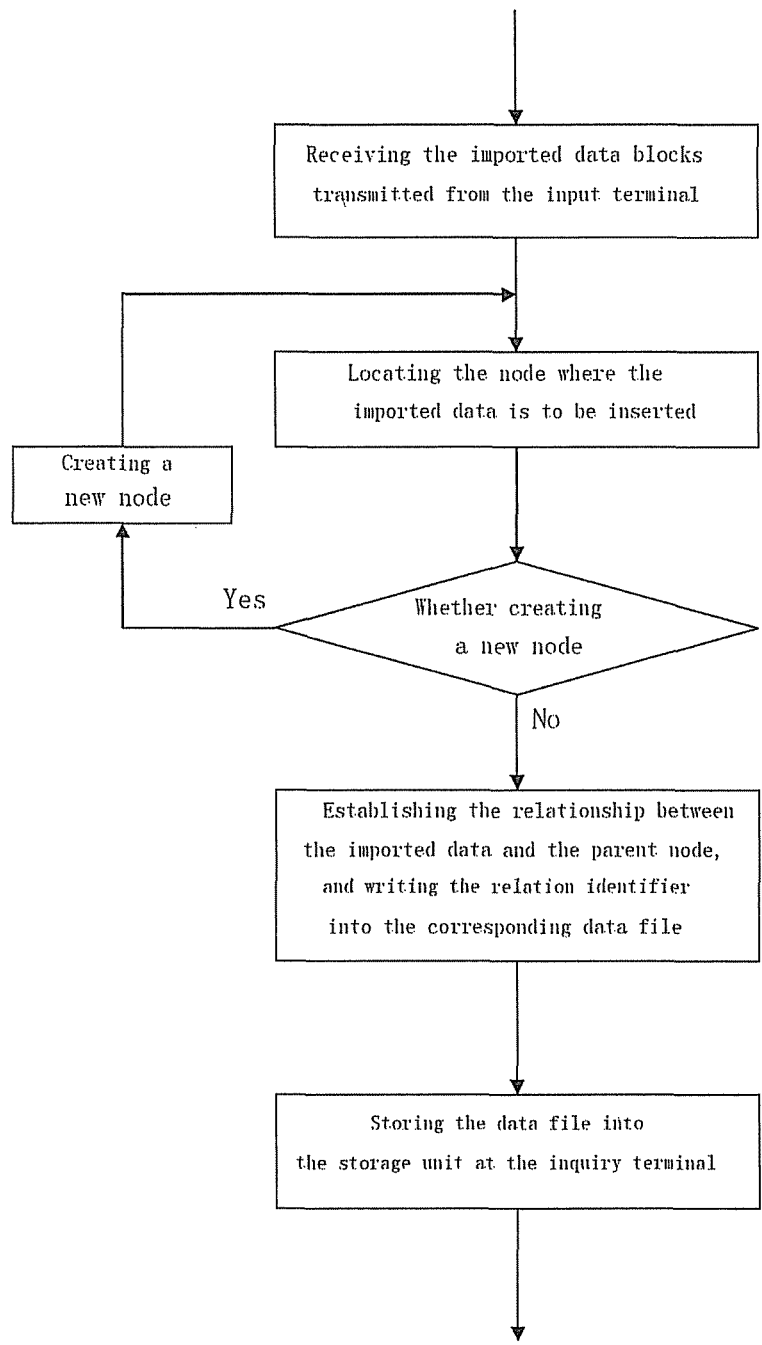
FIG. 9 is a flow chart of the inquiry terminal receiving data files from the input terminal of the present invention.

With reference to FIG. 9, said step B specifically includes the following steps:
   B1. selecting the node position where the data file is to be inserted at the inquiry terminal, and establishing a new node if necessary;
   B2. generating a relation identifier pointing to the parent node;
   B3. writing the generated identifier into the data file;
   B4. storing the data file into the second storage unit; wherein said step B4 specifically includes the following steps:
   B41. the inquiry terminal sending the local version information to the data input terminal;
   B42. the data input terminal sending update message to the inquiry terminal according to the version information of the inquiry terminal;
   B43. determining if the inquiry terminal is to updates data, if an update is determined, the data input terminal transmitting data file to the inquiry terminal;
   B44. the inquiry terminal storing the data file into the second storage unit after receiving the data file;

With reference to FIG. 8, the inquiry terminal inquiring the address list information according to the present invention comprises the following steps:
   D1. displaying the treelike address list;
   D2. the user selecting a node;
   D3. determining whether said node is the scope of inquiry, if it is, performing step D4, if it is not, performing step D5;
   D4. if the selected node is the scope of inquiry, inputting one character of the keyword to inquire and displaying the result of inquiry;
   D5. if the selected node is not the scope of inquiry, determining if said node is the leaf node, if it is, displaying the record information of the contacts under said node; if it is not, returning to step D2.

Figure 10:
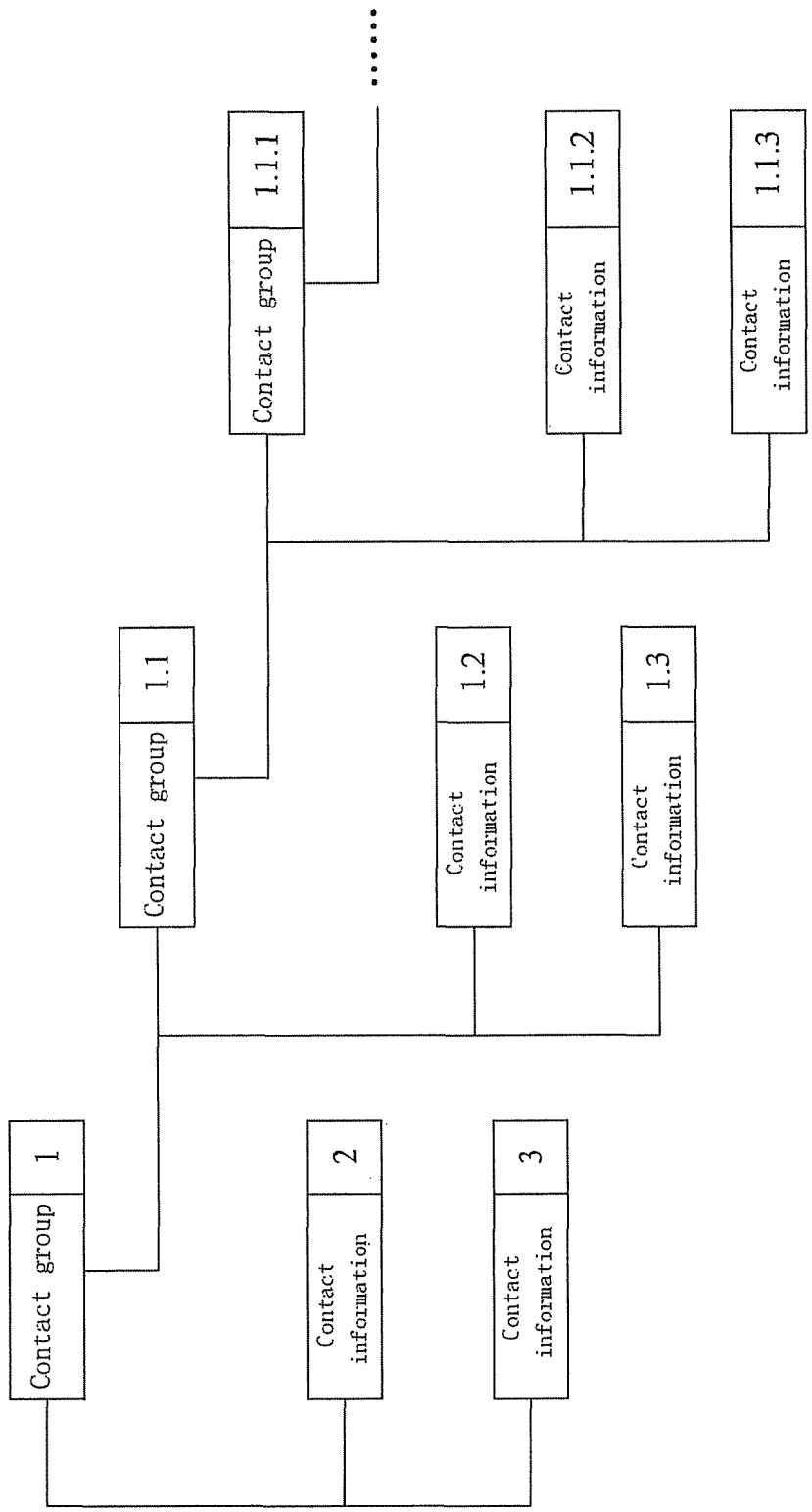
FIG. 10 is a schematic drawing of the treelike structure relationship of the address list information in the data files at the input terminal of the present invention.
Figure 11:
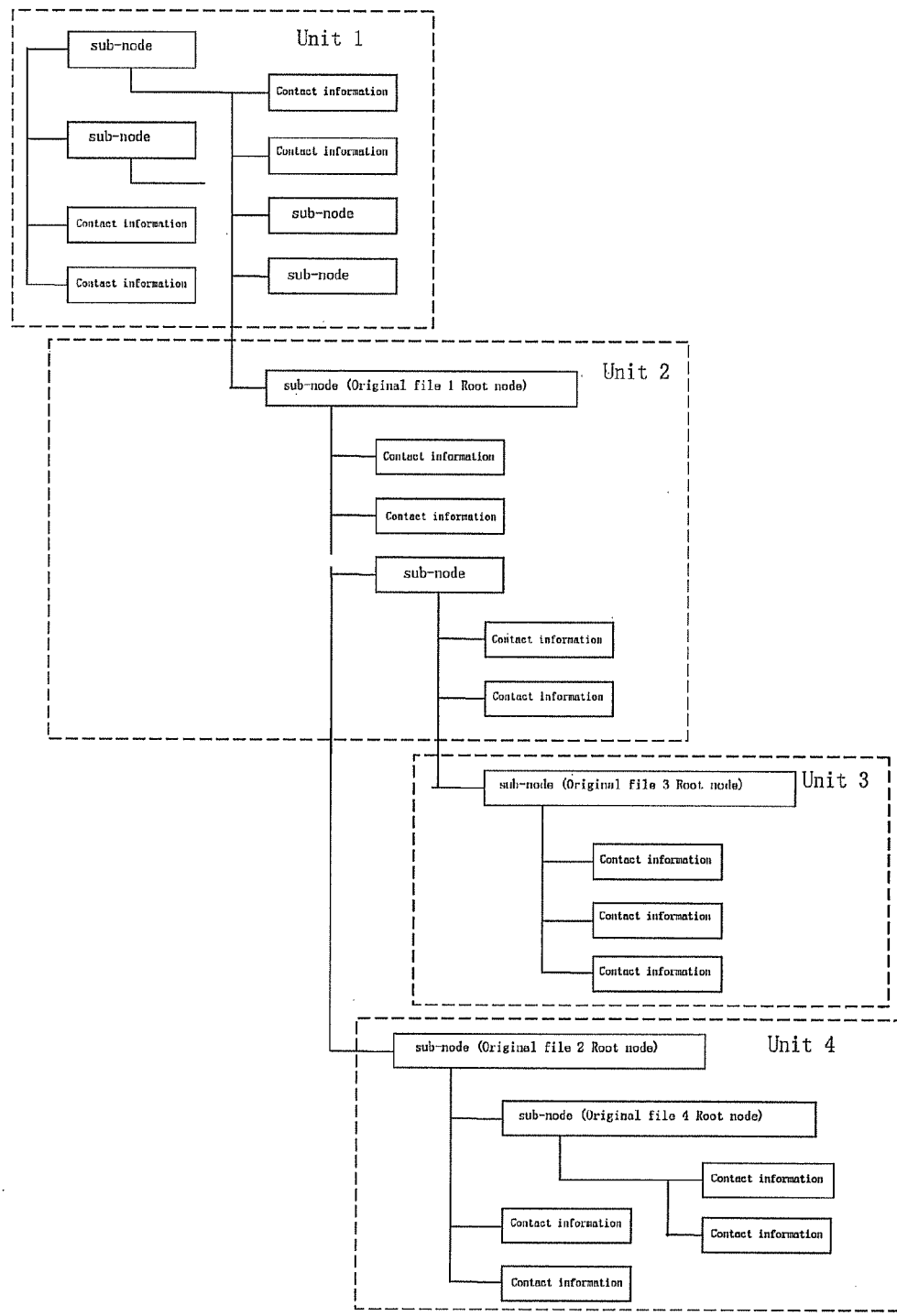
FIG. 11 is a schematic drawing of the treelike structure relationship of the address list information at the inquiry terminal.

In step C, the inquiry unit of the inquiry terminal generates a treelike address list according to the relation identifier pointing to the parent node, and the treelike structure is shown in FIGS. 10 and 11. As shown in FIG. 10, the data file at the input terminal contains the node information and contact record information, both having a relation identifier pointing to the parent node and a sequence number, the node information and contact record information are layered according to their relation identifier pointing to the parent node, and the node information or contact record information having the same relation identifier pointing to the parent node are arranged in the same layer according to the sequence number; as shown in FIG. 11, the treelike structure at the inquiry terminal comprises information in more than one data files of the original input terminal, after the data files are transmitted to the inquiry terminal, information therein (including the node information and record information) are attached to a certain selected node of the treelike structure at the inquiry terminal to form a new treelike address list for the user to inquiry.

The above are only preferred embodiments of the present invention, which are not intended to limit the present invention. Obviously, those skilled in the art can make various modifications and variations to the present invention without departing from the spirit and scope of the present invention. Therefore, if such modifications and variations of the present invention fall into the scope of the claims of the present invention and the equivalent techniques, then the present invention intends to include such modifications and variations.

What is claimed is:

1. An address list system, characterized by comprising multiple data input terminals and multiple inquiry terminals that are separate devices having different functions inside the address list system, the multiple inquiry terminals respectively belong to respective user of multiple users, the number of the multiple users is the same as or less than that of the multiple inquiry terminals, each of the data input terminals comprising:
a first input unit for inputting address list information to a first data processing unit;
a first data processing unit for receiving the address list information inputted by the input unit and performing format conversion so as to form at least one data file having a uniform data format, said data file of a uniform data format containing at least one piece of a record;
a first storage unit for storing data generated by the first data processing unit; and
a transmission unit for establishing a connection with some of the inquiry terminals and unidirectionally transmitting the data file of a uniform data format to the some of the inquiry terminals respectively, the data file containing:
record information and node information including a first relation identifier of a node or record pointing to a parent node; and
a second relation identifier of the data file pointing to the parent node;
wherein data items of each record consist of uniform data items and individualized data items;

wherein each of the inquiry terminals comprises:
a receiving unit for establishing a connection with some of the data input terminals and receiving respective data file of a uniform data format transmitted from each of the some of data input terminals;
a second storage unit for storing the data file of a uniform data format received by the receiving unit;
a second data processing unit for operating and controlling the data file of a uniform data format; and
an inquiry unit for:
performing local inquiry on the address list information in the second storage unit and locating a node position where imported data is to be inserted by the each of the inquiry terminals, establishing a new node if necessary, then locating the node position for insertion;
establishing a relationship between the imported data and the parent node, and writing a relation identifier pointing to the parent node into corresponding data files of a uniform data format;
wherein the address list information at the inquiry terminal exhibits organization and categorization relations of the respective data in a treelike structure, and
wherein the address list information at the inquiry terminal is different among the multiple inquiry terminals, and
wherein the communication between the inquiry terminals and the data input terminals is unidirectional from the data input terminals to the inquiry terminals, and multiple different data files of uniform data format generated in the multiple input terminals can be transmitted to the same inquiry terminal, and the same data file of uniform data format generated in the same input terminal can be transmitted to the multiple inquiry terminals.

2. The address list system according to claim 1, characterized in that, the inquiry unit organizes at least one data file of a uniform data format into a treelike structure according to the relation identifier pointing to the parent node, said address list is displayed in a tree structure formed by at least one sub-tree.

3. The address list system according to claim 1, characterized in that the uniform data items in the respective data files of a uniform format are respectively defined, and a combination of a plurality of data files of a uniform data format but having different uniform data items is allowed in the same treelike structure of the same inquiry terminal.

4. The address list system according to claim 1, characterized in that the data input terminal is a computer, and address list information can be communicated among a plurality of terminals.

5. The address list management system according to claim 1, characterized in that the inquiry terminal is a device having the function of a telephone.

6. The address list system according to claim 1, characterized in that the first input unit inputs information by means of an input device entering or file importing.

7. The address list system according to claim 1, characterized in that the inquiry terminal further comprises a reading unit for reading the address list information in the subscriber identity module and for storing said information into the second storage unit.

8. The address list system according to claim 1, characterized in that the inquiry terminal further comprises a second input unit for inputting address list information and for storing said information into the second storage unit.

9. The address list system according to claim 1, characterized in that after transmitting the new data file of a uniform data format to the inquiry terminal, information therein is attached to a certain node of the treelike structure of the address list at the inquiry terminal.

10. The address list system according to claim 1, characterized in that the second storage unit consists of a public data area and a private data area.

11. A method of implementing an address list, characterized by comprising the following steps:
A. inputting respective address list information and forming and storing a respective data files of a uniform format at each of a multiple data input terminals, the data file containing:
record information and node information including a first relation identifier of a node or record pointing to the parent node; and
a second relation identifier of the data file pointing to the parent node;
wherein data items of each record consist of uniform data items and individualized data items;
B. preparing data at the data input terminals, and the data input terminals interacting with an multiple inquiry terminals to update the data files of a uniform data format in the inquiry terminals, by:
B1. locating a node position where imported data is to be inserted at the inquiry terminal, and establishing a new node if necessary, then locating the node position for insertion;
B2. establishing a relationship between the imported data and the parent node, and writing the relation identifier pointing to the parent node into corresponding data files of a uniform data format; and C. forming a respective treelike address list at the inquiry terminals;

wherein the data input terminal and the inquiry terminal are separate devices having different functions, and wherein the multiple inquiry terminals respectively belong to respective user of multiple users, the number of the multiple users is the same as or less than that of the multiple inquiry terminal;

and wherein respective treelike address list at the inquiry terminals is different among the multiple inquiry terminals, and wherein the communication between the inquiry terminals and the data input terminals is unidirectional from the data input terminals to the inquiry terminals, and wherein forming the respective treelike address list comprises: transmitting multiple different data files of uniform data format generated in some of the multiple input terminals to the same inquiry terminal.

12. The method according to claim 11, characterized in that step A specifically includes the following steps:

A1. setting data items;

A2. establishing sub-nodes or inputting record data; and

A3. generating a relation identifier of each sub-node or each entered record pointing to the parent node and assigning it to the sub-node and/or record.

13. The method according to claim 12, characterized in that step A1 includes the following steps:

A11. setting the maximum number of data items; and

A12. setting uniform data items.

14. The method according to claim 13, characterized in that information is inputted by manual entering at step A2, which specifically includes the following steps:

A21. entering data content of the uniform data items;

A22. ending the entering process of the record if there is no individualized data item;

A23. inputting title and data content of the individualized data item if there is one or more individualized data items; and A24. storing individualized data information into an individualized data table.

15. The method according to claim 14, characterized in that information is inputted by means of importing files in step A2, which specifically comprises the following steps:

A25. selecting the file to be imported;

A26. selecting to convert the imported files into data files of a uniform data format or to insert the imported files into existing data files of a uniform data format;

A27. performing conversion if selecting to convert the imported files of a uniform data format into data files; and A28. if selecting to insert the imported files into the existing data files of a uniform data format, then first determining node position where the imported files are to be inserted, and establishing a new node if necessary, and inserting the imported files to the determined node after format conversion.

16. The method according to claim 11, characterized in that said step B specifically includes:

B3. storing the data files of a uniform data format into the second storage unit at the inquiry terminal.

17. The method according to claim 16, characterized in that said step B3 specifically includes the following steps:

B31. the inquiry terminal sending local version information to the data input terminal;

B32. the data, input terminal sending an update message to the inquiry terminal according to the version information of the inquiry terminal;

B33. determining if the inquiry terminal is to update data, if update is determined, the data input terminal transmitting data files to the inquiry terminal; and B34, the inquiry terminal receiving the data files of a uniform data format and storing it in an second storage unit at the inquiry terminal.

18. The method according to claim 11, characterized in that in step c, an inquiry unit of the inquiry terminal generates a treelike address list according to the relation identifier pointing to a parent node.

\* \* \* \* \*